United States Patent
Philippe et al.

(10) Patent No.: US 9,926,964 B2
(45) Date of Patent: Mar. 27, 2018

(54) THREADED INSERT

(71) Applicant: LISI AEROSPACE, Paris (FR)

(72) Inventors: Alan Philippe, Lamballe (FR); Gildas Boleis, Lantic (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 15/125,139

(22) PCT Filed: Mar. 10, 2015

(86) PCT No.: PCT/EP2015/054891
§ 371 (c)(1),
(2) Date: Sep. 9, 2016

(87) PCT Pub. No.: WO2015/135899
PCT Pub. Date: Sep. 17, 2015

(65) Prior Publication Data
US 2016/0377110 A1 Dec. 29, 2016

(30) Foreign Application Priority Data
Mar. 11, 2014 (FR) ..................... 14 52018

(51) Int. Cl.
*F16B 39/22* (2006.01)
*F16B 39/284* (2006.01)
(Continued)

(52) U.S. Cl.
CPC ............ *F16B 39/284* (2013.01); *F16B 39/22* (2013.01); *F16B 39/34* (2013.01); *F16C 35/07* (2013.01); *F16C 35/067* (2013.01)

(58) Field of Classification Search
CPC ........ F16B 35/067; F16B 35/07; F16B 39/22; F16B 39/284; F16B 39/34; F16B 39/38
(Continued)

(56) References Cited

U.S. PATENT DOCUMENTS 684,909 A * 10/1901 Cole ...................... H02G 3/083
174/153 G
2,444,847 A    7/1948 Poupitch
(Continued)

FOREIGN PATENT DOCUMENTS

| DE | 2142954 A1 | 8/1971 |
| FR | 2407385 A2 | 5/1979 |
| FR | 2941507 A1 | 7/2010 |

OTHER PUBLICATIONS

Fritzen, Claas, International Search Report, dated Jun. 12, 2015, 4 pages, WIPO.

Primary Examiner — Roberta S Delisle
(74) Attorney, Agent, or Firm — Henricks, Slavin & Holmes LLP

(57) ABSTRACT

The invention relates to an insert (10) comprising a first end (12) defining a circular opening (14), a cylindrical body (16) having an inner wall (18) and an outer wall, and a second end (20) defining an opening (22) and forming an enlarged flange (24), characterized in that the body comprises a first portion (28) adjacent to the first end and provided with an outer thread (30), and a second portion (32) adjacent to the first portion and comprising at least two cutouts (34) defining at least two flexible tabs (36) extending axially, and each tab has an outer thread (38) and forms an angle ($\alpha$), towards the outside of the body, with respect to the axis (A).

Figure 3:
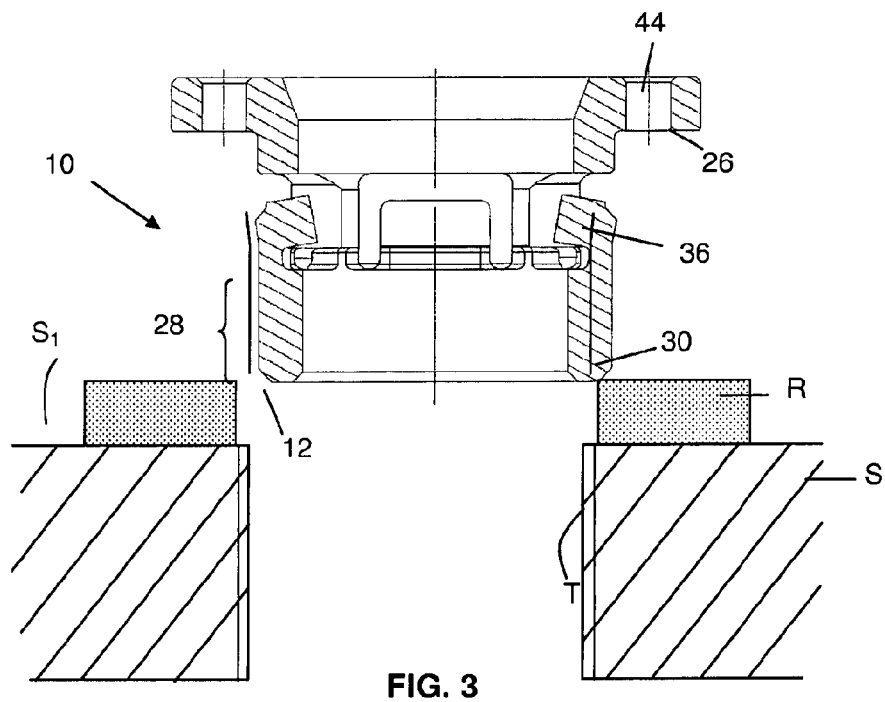

Such an insert is used for axially positioning the outer rings of bearings.

12 Claims, 2 Drawing Sheets

(51) Int. Cl.
*F16B 39/34* (2006.01)
*F16C 35/07* (2006.01)
*F16C 35/067* (2006.01)

(58) Field of Classification Search
USPC .............................. 411/305, 306, 307, 508
See application file for complete search history.

(56) References Cited

U.S. PATENT DOCUMENTS

| | | | |
|---|---|---|---|
| 2,750,979 A | 6/1956 | Jewett | |
| 3,194,107 A * | 7/1965 | Baliard | F16B 37/02 29/509 |
| 3,269,251 A * | 8/1966 | Bass | F16B 37/122 411/21 |
| 3,383,975 A | 5/1968 | Cushman | |
| 5,236,272 A * | 8/1993 | Hibbard | F16B 43/001 403/24 |
| 5,400,461 A * | 3/1995 | Malish | A47L 11/162 15/230 |
| 5,709,917 A * | 1/1998 | Carmien | E02D 17/083 138/140 |
| 6,079,922 A * | 6/2000 | Ross | F16B 13/122 411/180 |
| 6,971,831 B2 * | 12/2005 | Fattori | F16B 21/082 16/2.1 |
| 7,090,454 B2 * | 8/2006 | Shain | F16B 37/00 411/190 |
| 9,506,495 B2 * | 11/2016 | Rouleau | F16B 39/286 |
| 2014/0377031 A1 * | 12/2014 | Rouleau | F16B 39/286 411/106 |

* cited by examiner

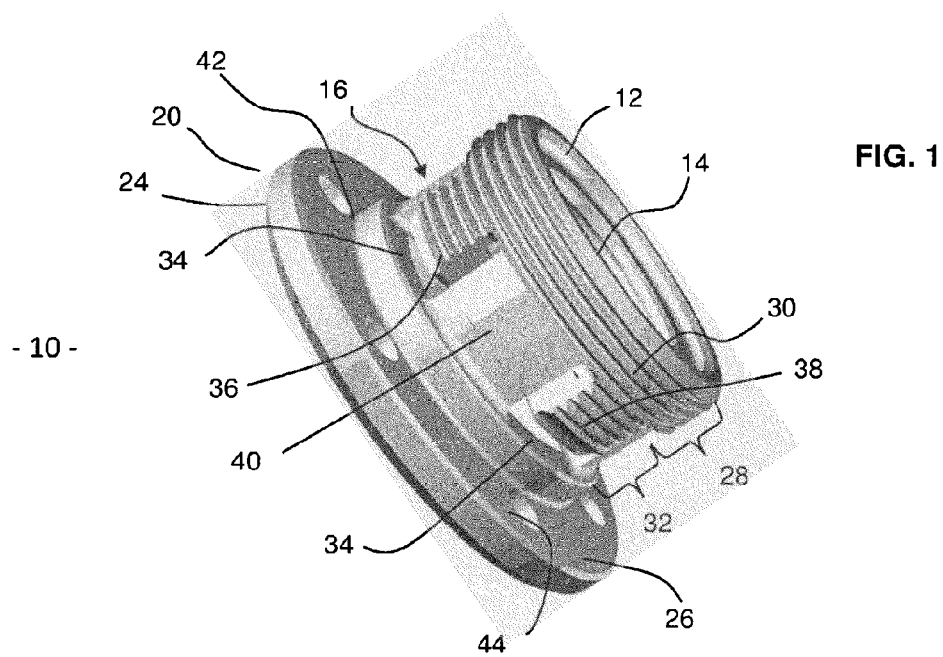
FIG. 1
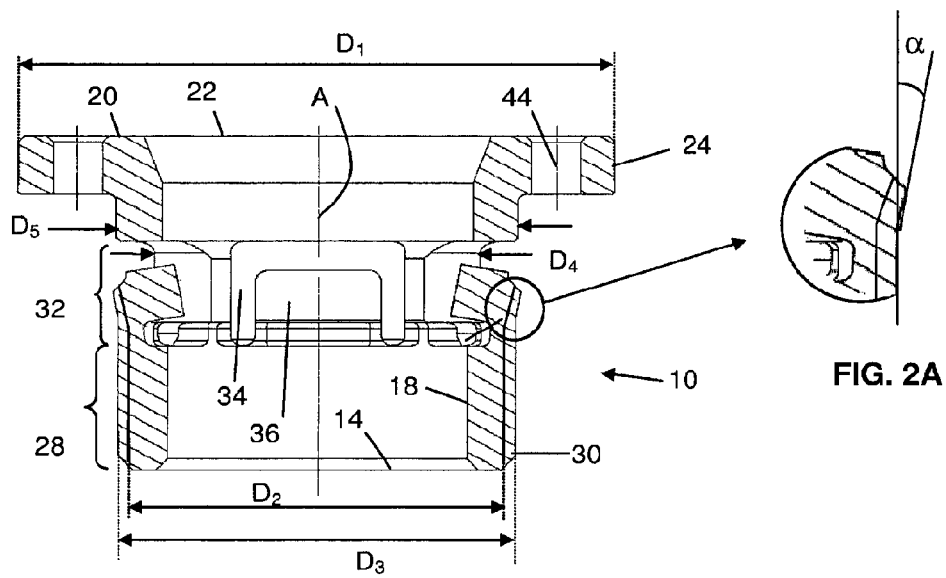
FIG. 2
FIG. 2A

THREADED INSERT

CROSS REFERENCE TO RELATED APPLICATIONS

This application is a National Stage of International Application No. PCT/EP2015/054891, filed Mar. 10, 2015, the entire contents of which are incorporated herein by reference.

The present invention relates to an insert threaded on the outer surface and comprising a locking means that prevents unwanted unscrewing of the insert after the insert has been installed. These inserts are used essentially for axially positioning and maintaining the position of bearing rings.

From the European standard EN4399:2008, a metal ring is known that comprises a cylindrical body threaded on the outer surface and comprising, at one end, multiple flexible tabs also threaded along their outside contour and folded outwards in order to carry out a locking function. This type of ring, however, does not allow assembly of bearings having a greater diameter than the ring.

A metal insert having a cylindrical body threaded on the outer surface, one of the ends of which comprises an enlarged flange and the other end of which comprises a locking ring made of polyimide and swaged onto the outside contour of the body, is also known. When the insert is installed in an inner thread made in a structure, the ring interferes with the top of the inner thread and carries out the locking of the insert. Such a ring cannot, however, be used at high temperature, which limits the uses of such an insert. Such a ring also increases the axial size of the insert. Moreover, the structure has to have a special shape that allows the insert to be inserted while delaying contact with the polyimide ring.

The goal of the invention is to provide an insert that does not have the disadvantages of the known inserts. The invention thus relates to an insert suitable for being inserted into an element comprising an inner thread, the insert comprising a first end defining a circular opening, a cylindrical body having an inner wall and an outer wall, and a second end defining an opening and forming an enlarged flange. The body comprises a first portion adjacent to the first end and provided with an outer thread, and a second end adjacent to the first portion and comprising at least two cutouts defining at least two flexible tabs extending axially, each tab having an outer thread and being at an angle, towards the outside of the body, with respect to the axis of the insert.

The locking means positioned in the middle of the body allows the insert to be pre-assembled up to the second portion, the primary function of which is locking, without requiring any particular opposing geometry in the structure.

Cutting out the tabs allows the proportion of surface in contact with the opposing inner thread to be adapted according to the expected level of performance.

The device according to the invention preferably has at least one of the features below, taken alone or in combination:

- the threads of the first portion and of the tabs have an identical pitch,
- the threads of the first portion and of the tabs have different pitches,
- the second portion comprises, between the cutouts, walls having an outer diameter smaller than the root diameter of the thread of the first portion,
- the insert further comprises a third portion positioned between the flange and the second portion and having an outer diameter greater than the crest diameter of the thread of the first portion and less than the outer diameter of the flange,
- the flange comprises a means for rotating the insert,
- the shape of the opening of the second end forms the means for rotating the insert,
- the shape of the contour of the flange forms the means for rotating the insert,
- the rotation means consists of at least two holes drilled in the plane of the flange,
- the cutouts are in the shape of a U or a V.

Figure 4:
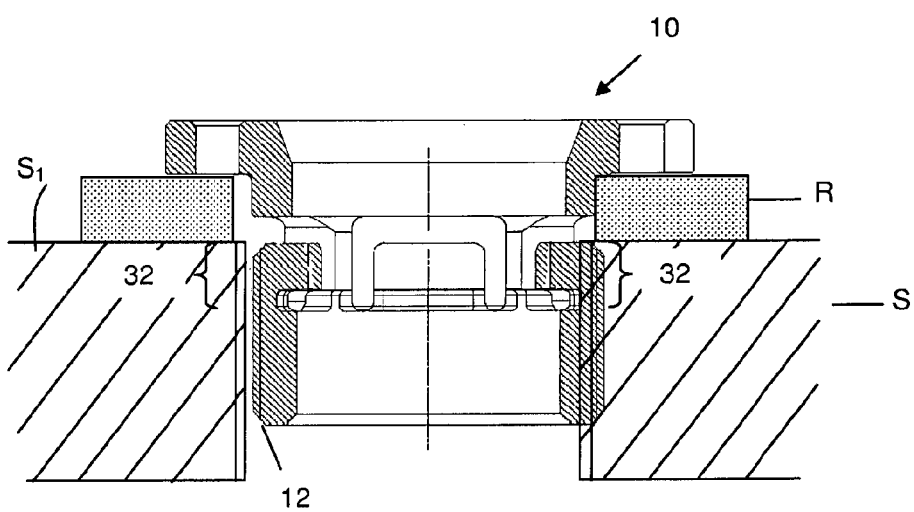

The invention will be better understood after reading the following description and examining the accompanying drawings. The drawings are provided for informational purposes only and do not exhaustively define the invention. The figures illustrate the following:

FIG. 1 a perspective drawing of an embodiment of an insert according to one embodiment of the invention;

FIG. 2 a cross-sectional view along the axis of revolution of the insert of FIG. 1;

FIG. 2A a magnified detail of a tab of FIG. 2;

FIG. 3 a cross-sectional view of the insert of FIGS. 1 and 2 before installation in a structure S;

FIG. 4 a cross-sectional view of the insert of FIGS. 1 and 2 installed in a structure S.

To facilitate understanding of the drawings, only the elements necessary for understanding the invention are shown. The same elements have the same reference signs from one figure to another.

FIGS. 1 and 2 show an insert 10 intended to be inserted into a structure S comprising a threaded hole T (FIG. 3). The insert 10 has an axis of revolution A and comprises a first end 12 defining a circular opening 14, a cylindrical body 16 having an inner wall 18 and an outer wall, and a second end 20 defining a circular opening 22. In one variant, the opening 22 can be non-circular—for example, in order to carry out the function of rotating the insert. The body of the insert is intended to receive a shaft that passes all the way through the insert 10. The inner wall 18 can be cylindrical or can comprise a means for fool-proofing the shaft, complementary to the shape of the shaft. The second end forms an enlarged flange 24 having an outer diameter $D_1$, and a surface 26 of said flange, oriented towards the first end 12, is intended to rest against an element to be assembled with and maintained on the structure—for example, a bearing ring positioned on the shaft. The outer diameter $D_1$ of the flange is greater than any other outer diameter of the insert 10.

The body 16 comprises a first portion 28 adjacent to the first end and provided with an outer thread 30. This thread is chosen in such a way as to be complementary to the inner thread T of the structure S. The thread 30 has a minimum root diameter $D_2$ and a maximum crest diameter $D_3$. The body 16 also comprises a second portion 32 adjacent to the first portion and comprising at least two cutouts 34 defining at least two flexible tabs 36 extending axially. In this embodiment, the body comprises four cutouts 34 in the shape of a U, each branch of the U extending parallel to the axis of revolution A and the branches being connected by a cutout perpendicular to the axis of revolution. Nevertheless, the shape of the cutouts 34 can vary—forming a V, for example. Each tab 36 formed has an outer thread 38 having a pitch identical to the pitch of the thread 30 of the first portion 28. Each tab 36 is plastically deformed during manufacture of the insert and forms an angle α, towards the outside of the body, with respect to the axis of the insert (FIG. 2A). "Identical pitch" is understood to mean that the threads 38 and 30 are each separated by the same distance.

The flexible tabs 36 carry out a function of locking the insert 10 in the structure S, thus ensuring that the insert does not unscrew under the effect of vibrations impressed on the shaft, or other actions. Depending on the diameter of the insert and the desired locking stress, the number of cutouts 34 and therefore tabs 36 can vary. The angle α can vary between 30° and 45°.

To increase the locking effect, the thread 38 of the tabs can vary in the direction of the axis A of revolution from the base of the tabs to the second end 20, as described in the patent FR2941507, instead of being identical to the thread of the first portion. In another variant, the thread 38 of the tabs can be coated with a thread-locking polymer such as that sold under the name LOCTITE™, ensuring chemical locking.

The second portion 32 comprises, between the cutouts 34, walls 40 that connect the flange 24 to the first portion 28. The maximum outer diameter $D_4$ of the walls 40 is less than the root diameter $D_2$ of the thread 30 of the first portion in order to not interfere with the crests of the inner thread. T of the structure. In the example illustrated in FIGS. 1 and 2, the walls 40 have a smooth outer surface obtained by machining.

The insert 10 also comprises a third portion 42 positioned between the flange 24 and the second portion 32. This portion, which has a cylindrical shape, has an outer diameter $D_5$ greater than the crest diameter $D_3$ of the thread 30 of the first portion 28. The diameter $D_5$ is also less than the outer diameter $D_1$ of the flange 26. The function of this third portion is to center the bearing ring R on the structure S. The diameter of this portion is therefore chosen in such a way as to correspond to the inner diameter of the bearing ring R to be assembled, and the length of this portion in the axial direction is also chosen according to the thickness of the bearing to be maintained between the bearing face 26 of the flange and a face $S_1$ of the structure against which the bearing rests.

In this example, the flange 24 comprises six through holes 44 regularly distributed in the plane of the flange. These holes form a means for rotating the insert 10 and are complementary to a tool comprising six pins. The holes 44 can be blind—for example, in order to maintain a sealing joint for fluids under the face 26. Of course, the number of holes and their shape can vary with respect to the example shown in the figures.

In one variant, these rotation means 44 can consist of the outer shape of the contour of the flange—for example, a hexagon or twelve teeth. The contour of the flange, seen from above, would then have a polygonal or multi-lobed shape and not a cylindrical shape. As previously explained, the opening 22 of the second end can also be used as a rotation means via a suitable shape into which a key is inserted—for example, a square or an Allen key.

The insert 10 can be made from a metal material, which allows said insert to be used at high temperatures, or from a polymer material such as PEEK when the temperature allows it and lighter mass is desired for the assembly.

When the insert 10 is made from a metal material, it is coated in a known manner by a metal coating such as silver plating or zinc-nickel, or by an aluminum-pigment polymer coating such as HI-KOTE™—provided by the company HI-SHEAR Corporation—in order to lubricate the insert and protect against galvanic corrosion. A liquid or grease lubricant can be applied as a second layer over the entire interior and/or exterior of the body 16.

FIGS. 3 and 4 illustrate the method for installing the insert 10 in the structure S comprising a threaded hole T. The body 16 of the insert 10 is placed through a bearing ring R in such a way that the first end 12 is the first to enter the inner thread T and the bearing R is sandwiched between the face 26 of the flange and a face $S_1$ of the structure. By using a tool comprising six pins that pass through the six holes 44 of the flange, the thread 30 of the first portion 28 is installed effortlessly in the inner thread T of the structure, over the entire axial distance of the first portion. When the tabs 36 enter into contact with the inner thread T, the thread 38 begins to interfere—in a more or less pronounced way depending on the bending angle α—with the opposing threading of the inner thread T. The installation torque thus increases. The angle α allows the outer flank of the thread 38 to bear against the inner flank of the thread T, which allows the resulting locking torque to be adjusted. The tabs 36 are gradually pushed towards the inside of the insert 10 as the insert 10 is screwed into the structure S, until the angle α formed with respect to the axis of revolution becomes zero, as visible in FIG. 4. The plastic deformation of the tabs 36 in the second portion 32 has the effect of opposing a constant stress normal to the structure, thus carrying out the function of locking the insert.

The insert 10 is then screwed in until the bearing face 26 enters into contact with the bearing R. The bearing R is kept firmly assembled to the structure without the risk of the insert 10 being unscrewed, and a shaft (not shown) can be inserted through the insert 10, the bearing R and the structure S.

The invention claimed is:

1. An insert positioned along an axis (A), said insert comprising a first end defining a circular opening, a cylindrical body having an inner wall and an outer wall, and a second end defining an opening and forming an enlarged flange, characterized in that the body comprises a first portion adjacent to the first end and provided with an outer thread, and a second portion adjacent to the first portion and comprising at least two cutouts defining at least two flexible tabs extending axially, each tab has an outer thread and forms an angle (α), towards the outside of the body, with respect to the axis, and the second portion further comprises, between the at least two cutouts, walls that connect the flange to the first portion.

2. An insert according to claim 1, wherein the threads of the first portion and of the tabs have an identical pitch.

3. An insert according to claim 1, wherein the threads of the first portion and of the tabs have different pitches.

4. An insert according to claim 1, wherein the walls have an outer diameter ($D_4$) smaller than the root diameter ($D_2$) of the thread of the first portion.

5. An insert according to claim 1, further comprising a third portion positioned between the flange and the second portion and having an outer diameter ($D_5$) greater than the crest diameter ($D_3$) of the thread of the first portion and less than the outer diameter ($D_1$) of the flange.

6. An insert according to claim 1, wherein the flange comprises a means for rotating the insert.

7. An insert according to claim 6, wherein the shape of the opening of the second end forms the means for rotating the insert.

8. An insert according to claim 6, wherein the shape of the contour of the flange forms the means for rotating the insert.

9. An insert according to claim 6, wherein the rotation means consists of at least two holes drilled in the plane of the flange.

10. An insert according to claim 1, wherein the cutouts are in the shape of a U or a V.

11. An insert according to claim 1, wherein the angle (α) with respect to the axis (A) is greater than zero.

12. An insert according to claim 1, wherein the angle (α) with respect to the axis (A) is between 30° and 45°.

* * * * *